United States Patent [19]

Rothmayer

[11] 4,036,652

[45] July 19, 1977

[54] ENCAPSULATED PIGMENTS

[75] Inventor: Jules Rothmayer, Cincinnati, Ohio

[73] Assignee: Sun Chemical Corporation, New York, N.Y.

[21] Appl. No.: 674,418

[22] Filed: Apr. 7, 1976

[51] Int. Cl.² .............................................. C08K 9/10
[52] U.S. Cl. ............................ 106/308 N; 106/288 B; 106/288 Q; 106/296; 106/300; 106/304; 106/307; 106/308 M; 106/309; 260/29.6 H; 260/29.6 PM; 260/42.21; 260/42.52; 260/42.55; 260/42.56
[58] Field of Search .............. 106/308 N, 308 M, 309; 260/29.6 CM, 29.6 PM, 29.6 H

[56] References Cited

U.S. PATENT DOCUMENTS

| 2,786,822 | 3/1957 | Vesce | 260/42.54 |
|---|---|---|---|
| 3,615,812 | 10/1971 | Clark | 206/308 M |

*Primary Examiner*—James H. Derrington
*Attorney, Agent, or Firm*—Cynthia Berlow

[57] ABSTRACT

Pigments may be encapsulated by a process comprising the steps of (1) mixing a high solids pigment presscake with ammonia and an ammonia-soluble resin to form a fluid mixture, (2) removing sufficient water from the mixture to form a kneadable mass, and (3) dispersing the mass under conditions of high shear to yield a finely divided encapsulated pigment presscake.

5 Claims, No Drawings

ENCAPSULATED PIGMENTS

This invention relates to encapsulated pigments. More particularly, it relates to a process for encapsulating or coating pigments with ammonia-soluble resins and to the pigments prepared by this process.

In the preparation of inks, paints, colored plastics, and the like, it is essential that the pigment be uniformly dispersed in the vehicle. It is also essential that the pigment not react with the other components of the inks, paints, and the like.

There are many techniques disclosed in the art for impoving the dispersiblity of pigments. Dispersibility can be enhanced, for example, by using the pigment in the form of a fine powder; however, powdered pigments are difficult to redisperse to obtain maximum dispersion and generally are difficult to wet out in aqueous systems without the use of special additives known as "wetting-agents" which at times are deleterious to the properties of the final ink or coating composition. The addition of surfactants or other dispersants to the pigment has also been suggested. This method has not been wholly successful in giving an adequate degree of dispersibility, unless used to produce aqueous dispersions in which high levels of such additives are incorporated with correspondingly low pigment content, thus producing adverse effects upon the final ink or coating.

It is also known that pigments can be encapsulated or coated; in general, however, such encapsulating techniques are complicated and use a relatively high binder content.

A summary of prior art forms of pigment dispersions is given below:

1. Dry Pigment Form

Pigments of this type are obtained in a conventional dry state. Disadvantages of this form are as follows:
 a. dusty and scatterable
 b. bulky
 c. difficult to wet out
 d. often require additional surfactants
 e. require prolonged processing in redispersion by conventional grinding equipment, e.g., ball mills, threeroll mills, etc.
 f. not a true "stir-in" system
 g. often impossible to redisperse completely 2. Presscake Form of Pigments This is a conventional aqueous system. Disadvantages are as follows:
 a. highwater content
 b. generally require surfactants to aid in final dispersion.

3. Aqueous Predispersion Form

This is a predispersion presscake form with typical levels of 5-15% surfactant-incorporation. It is also an effective "stir-in"system. Disadvantages are as follows:
 a. high water content
 b. specific surfactant additives restrict application systems
 c. foaming problems
 d. strong hydrophilicity in dry film 4. Dry Water Dispersible Form This type exhibits high pigment content, typically around 50%. Disadvantages are as follows:
 a. high surfactant loading (20-50%)
 b. foaming problems
 c. useful only where foam and high surfactant level can be tolerated, generally not in ink 5. Liquified Predispersion Systems These types possess a high pigment loading (40-55%). Disadvantages are as follows:
 a. high levels of surfactants (10-20%)
 b. solvent diluents, e.g., glycols, limit range of applicability
 c. problems with stability to evaporation, settling, rheology, etc.

6. Easily Dispersible Dry Pigments

These typically contain 10-25% levels of surfactants and are designed as "dry stir-in" products. Disadvantages are as follows:
 a. generally not suitable for aqueous systems
 b. surfactants may limit the range of applicability
 c. rehology problems, e.g., reticulation 7. Resin-bonded Predispersed Pigment Form These typically are formed with high resin loading (30-60%). Disadvantages are as follows:
 a. expensive to produce
 b. specific resination limits range of system applicability
 c. reactivity and capability of resin It has now been found that these disadvantages can be substantially overcome and a superior encapsulated pigment presscake product can be produced by a novel process that comprises the following steps:

1. preparing a high solids pigment presscake by any known method from a conventional presscake containing about 15 to 30 per cent of pigment, for example, by evaporating or vacuuming off water or by displacing water with a non-miscible solvent. The resulting presscake contains about 50 to 60 per cent of pigment and about 40 to 50 percent of water;
2. mixing the resulting high solids pigment mass with an ammoniacol resin solution, whereby the presscake is peptized by the resin into a thin, watery fluid product;
3. removing water from the watery product by evaporation, vacuuming, decantation, or the like, while continually mixing the materials, resulting in a thick, plastic, kneadable mass; and
4. dispersing the kneadable mass under conditions of high shear to encapsulate the pigment presscake.

The products are encapsulated pigment presscakes containing about 50 to 80 parts of pigment, about 10 to 40 parts of ammoniated resin, and about 10 to 40 parts of water. Generallly the ratio of resin to pigment is about 10 to 40 parts of resin:100 parts of pigment, and preferably the ratio is about 20 to 30:100.

The pigments require no post-treatment before use. They are easily dispersible in water- or solvent-based ink systems; they contain no surfactants, and they exhibit minimal levels of foam in ink manufacture.

The process of this invention is equally applicable to organic and inorganic pigments and to dyestuffs, such as for example phthalocyanines, quinacridones, conventional azo pigments such as benzidine yellows and oranges, pyrazolone reds and oranges, dinitroaniline orange, lithol reds, naphthol reds, BON and lithol rubines, azo condensation pigments, isoindolinones, titanium oxides, zinc oxides, iron oxides, carbon blacks, and the like.

The resin employed in step (2) is an ammonia-soluable resin, particularly an acrylic resin, such as a homopolymer, copolymer, or interpolymer of an acrylate or methacrylate. Specific examples include, but are not limited to, polymers, copolymers, and interpolymers based on methyl, ethyl, butyl, octyl, hydroxyethyl, hydroxypropyl, and ethylhexyl acrylate or methacrylate, and the like, and mixtures thereof. Suitable resins include aqueous acrylic colloidal dispersion resins, e.g., Acrysol I-94 (Rohm and Haas Company); solid flaked acrylic resins, e.g., Joncryl 67 and Joncryl 678 (S.C. Johnson & Son, Inc.); water-based acrylic resins, e.g., Lucidene 440 (Morton Chemical CO.); and the like. The resins possess good gloss, adhesion, stability, transfer, and solvent release characteristics and are stable to alkali sensitive pigments.

The amount of acrylic resin added to the high solids pigment presscake mass is about 10 to 40, and preferably about 20 to 30, parts per 100 parts of pigment mass. The acrylic resin is added in the presence of ammonia, the amount of ammonia being about 5 to 50, and preferably about 15 to 25, parts per 100 parts of the pigment.

Either emulsion, solution, or dry forms of the resin can be used in this process. Additionally, the resin may be added in the reverse order to he presscake. The mode of addition is not critical and can entail addition of resin to pigment slurry during the manufacturing process or addition of resin to the presscake at other stages in the aforesaid process.

In order to obtain the unique encapsulated pigment presscakes of this invention, the dispersion in step (4) must take place under conditions of high shear agitation, such as for example by agitation in a heavy duty dispersion or sigma blade mixer, a Banbury mill, a Manton-Goulin homogenizer, or other such similar intensive dispersion equipment. Mixing the pigment, water, resin, and ammonia in conventional dispersing equipment, such as a Cowles Dissolver, does not result in encapsulated high solids pigment presscakes having the unique properties of those of this invention, since such conventional dispersion techniques fail to obtain the high degree of dispersion necessary. Such equipment is adequate, however, for low pigmented surfactant-containing aqueous slurries.

The process can be carried out at any suitable temperature and pressure, for example at a temperature within the range of about 0° to 100° C. and at atmospheric pressure or under a vacuum.

The products of this invention are modified high solids presscakes of organic or inorganic pigments or dyestuffs containing about 50 to 80 percent of the pigment, about 15 to 25 percent of the ammoniated resin, and the remainder water. They are particularly suited for use in water-based ink systems where they demonstrate ease of dispersibility, gloss, color strength, and transparency that are far superior to conventional dry colors and to unmodified high solids presscakes. They are also suitable for use in aqueous paint systems, textile ink systems, and other aqueous-based dispersion systems.

The invention will be further described in the following examples. Unless otherwise indicated, all parts are by weight.

EXAMPLE 1

A presscake containing 25 per cent of phthalocyanine blue pigment and 75 per cent of water was charged into a jacketed heavy duty sigma blade dispersion mixer. Water was evaporated (using steam in the jacket), optionally under vacuum, until the presscake contained 50 percent of pigment and 50 percent of water.

1000 Parts of the resulting high solids presscake was mixed with 40 parts of ammonia (26°Be) and 500 parts of Acrysol 1-94 (Rohm and Haas' acrylic resin emulsion containing 30 percent solids), resulting in a thin, watery mixture. Mixing and removal of water by evaporation were continued until a plastic, kneadable mass was obtained.

This kneadable mass was then dispersed under high shear conditions to encapsulate the pigment presscake and yield 840 parts of a finely divided product containing 55 percent of phthalocyanine pigment, 17.5 percent of ammoniated acrylic resin, and 27.5 percent of water. The product was easily discharged into a closed container and was non-dusting.

EXAMPLE II

The procedure of Example I was repeated with each of the following acrylic resins instead of Acrysol I-94: Joncryl 67 (S.C. Johnson), Joncryl 678 (S. C. Johnson), and Lucidene 440 (Morton Chemical). The results were comparable.

EXAMPLE III

The procedure of Example I was repeated with each of the following pigments instead of phthalocyanine blue: barium lithol, AAOT diarylide yellow, iron blue, lithol rubine, phthalocyanine green, dinitroaniline orange, and quinacridone red. The products were finely-divided encapsulated pigment presscakes containing about 50 to 80 percent of pigment, about 15 to 25 percent of ammoniated acrylic resin, and about 5 to 35 percent of water.

EXAMPLE IV

A flexographic ink was prepared in a conventional manner in a ball mill for 24 hours from the following ingredients:

|  | Parts |
| --- | --- |
| encapsulated pigment of Ex. I | 27.3 |
| water | 36.2 |
| aqueous ammonia (26° Be) | 7.0 |
| acrylic resin (Joncryl 67) | 18.5 |
| diethylene glycol monoethyl ether | 5.0 |
| antifoam agent | 1.0 |
| isopropanol | 5.0 |

The pigment was easily dispersed into the system, the ink was exceptionally glossy and transparent as compared to an ink prepared as above except that the pigment was not encapsulated.

EXAMPLE V

A. A flexographic ink was prepared from the ingredients of Example IV except that the dispersion was carried out by means of a high-speed, high-shear mixer of the Cowles type during a period of 45 minutes. The results were comparable.

B. When a conventional dry pigment was used in the formulation of part (A) instead of the encapsulated pigment, the resulting product was unacceptable as a finished ink.

What is claimed is:

1. A process for encapsulating pigments which comprises the steps of (1) mixing a high solids pigment presscake containing about 40 to 50 percent by weight of water with ammonia and an ammonia-soluble acrylic resin to form a fluid mixture, (2) removing sufficient water from the mixture to form a kneadable mass, and (3) dispersing the mass under conditions of high shear to yield a finely-divided encapsulated pigment presscake, the amount of resin being about 10 to 40 parts by weight per 100 parts by weight of pigment presscake and the amount of ammonia being about 5 to 50 parts by weight per 100 parts by weight of pigment.

2. The process of claim 1 wherein the pigment is organic.

3. The process of claim 1 wherein the pigment is inorganic.

4. An encapsulated pigment presscake prepared by the process of claim 1.

5. The encapsulated pigment presscake of claim 4 which contains about 50 to 80 percent by weight of pigment, about 15 to 25 percent by weight of ammoniacal resin, and the remainder water.

* * * * *